A. W. WEITERSHAUSEN.
LEADED GLASS CONSTRUCTION.
APPLICATION FILED MAR. 5, 1914.
1,112,420.
Patented Sept. 29, 1914.
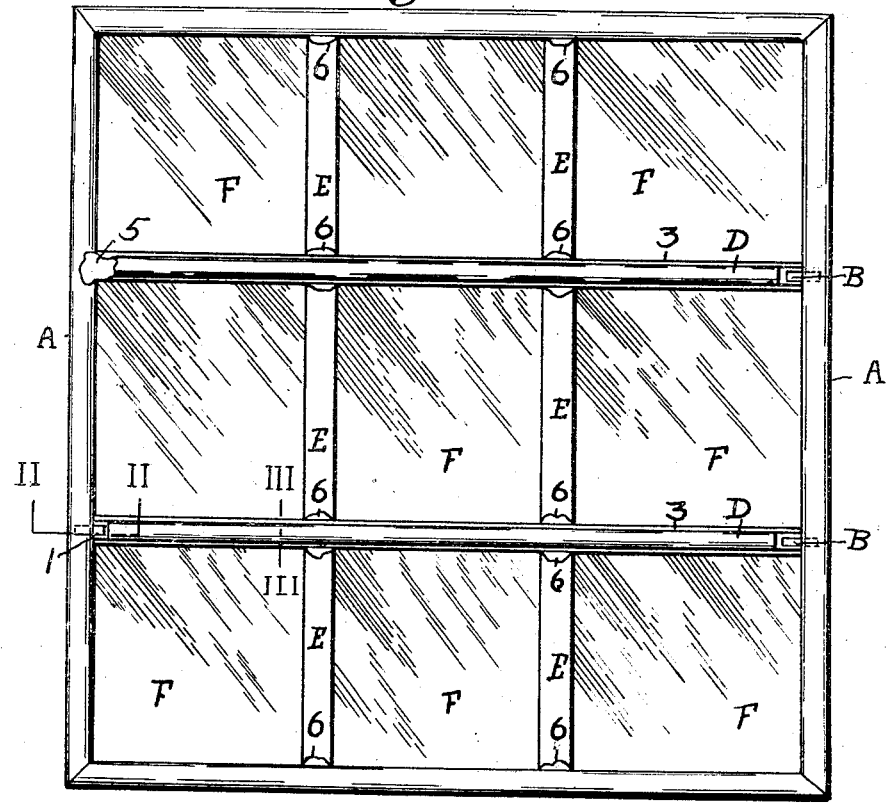
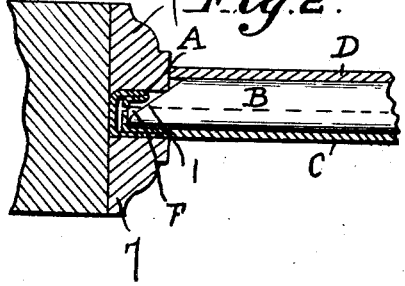
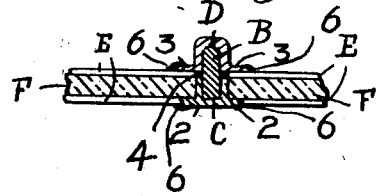
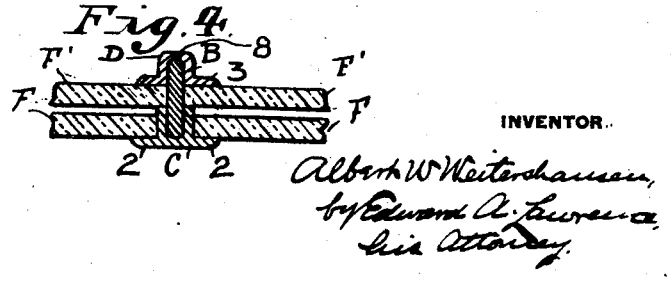
WITNESSES
INVENTOR

UNITED STATES PATENT OFFICE.

ALBERT W. WEITERSHAUSEN, OF MILLVALE BOROUGH, PENNSYLVANIA, ASSIGNOR TO PITTSBURGH ART GLASS COMPANY, OF PITTSBURGH, PENNSYLVANIA, A CORPORATION OF PENNSYLVANIA.

LEADED GLASS CONSTRUCTION.

1,112,420.

Specification of Letters Patent. Patented Sept. 29, 1914.

Application filed March 5, 1914. Serial No. 822,598.

*To all whom it may concern:*

Be it known that I, ALBERT W. WEITERSHAUSEN, a citizen of the United States, and residing in the borough of Millvale, in the county of Allegheny and State of Pennsylvania, have invented or discovered new and useful Improvements in Leaded Glass Construction, of which the following is a specification.

My invention consists in new and useful improvements in the construction of leaded glass panels for windows, doors and other ornamental purposes.

The objects in view are the cheapening and expediting of the manufacture of such structures; the prevention of bulging of the same in use and, in a word, the production of a more durable, rigid and sightly structure at less expense.

In the present practice the edges of the glass panes or pieces are inserted in lead channels which form a frame and cross-bars soldered together, the cross-bars being double channels to secure the edges of adjacent panes. To stiffen the assembled structure hard metal bars are laid edgewise along certain of the lead channels and at intervals soldered in place, the ends of said bars being seated in recesses cut into the wooden sash or frame. The soldering of the hard metal bars to the lead channels requires a preliminary acid treatment which clouds the glass and must be cleaned off, thus requiring two cleansings of the panel, the first being after the lead channels are soldered together at their intersections.

In the present practice the weight of the lead and glass hangs from the soldered points of connection with the edge of the reinforcing bar which connections are easily broken, permitting the structure to sag and bulge. The soldered connections between the reinforcing bars and the lead channels also form an unsightly feature on the inside of the window and the reinforcing bars being exposed, become rusted and corroded owing to the condensation on the inner surfaces of the glass. Sometimes said bars are galvanized with indifferent results and added expense. In my construction, I overcome these objectionable features by making certain of my lead members in two parts which inclose between them the flat hard metal reinforcing bars, thus entirely protecting the latter from corrosion and concealing them from view. The two parts of the channel members are soldered together to hold the bar in place thus avoiding the soldering of hard metal to lead and the use of acid. The reinforcing bars are spaced apart at proper intervals, say twelve inches, to give the requisite strength and the ends of the said bars are inserted in the channel member which forms the frame or boundary of the panel, the lead channels being soldered to said frame. To support the edges of the panes or pieces of glass lengths of lead double channels span the spaces between the reinforcing bars and between the said bars and the parallel sides of the border at proper intervals and are soldered in place.

In the accompanying drawings, Figure 1 is a plan view of a panel formed in accordance with my invention; Fig. 2 is an enlarged detailed section taken along the line II—II in Fig. 1 and showing the sash or wooden frame in which the panel is to be mounted; Fig. 3 is an enlarged detail taken in section along the line III—III in Fig. 1, and Fig. 4 is a cross section, taken similarly to Fig. 3, but showing a modification wherein my invention is used for double glazing.

The following is a detailed description of the drawings: A represents the outer border or boundary of the panel which is usually and conveniently formed by bending up a length of heavy zinc or other suitable material into the cross-sectional form best shown in Fig. 2. If desired the border may be of lead channel instead of hard metal.

B represents the reinforcing bars which are flat bars of hard metal, such as steel of sufficient length to span the panel and have their beveled ends 1 inserted in the channel of the border A. The bars B are inclosed throughout their lengths by lead channel members. Thus the member C is of substantially U-shape having lateral flanges 2 at its base while the coacting member D is also of substantially U-shape having the lateral flanges 3 at its mouth. When assembled the bar B is entirely inclosed by the members C and D and said members are soldered together at intervals as at 4 to hold them together about the bar B. At their ends the members C and D are soldered to the border A as at 5, thus holding the bars B in place in relation to the outer frame. E represents short lengths of lead double channels which span the spaces between the bars B and between said bars and the parallel sides of the border A. The ends of the channels E are soldered to the member C and D to the border A, as at 6.

F are the panes or pieces of glass whose edges are inserted between the flanges 2 and 3 of the members C and D and the flanges of the double channels E and also in the case of the outside panes into the border channel A.

The panel is preferably assembled as follows: The members C are first placed in position and the panes F laid with their edges on the flanges 2. The members E are next laid in place with the edges of the panes F inserted in their channels and said members are then soldered to the members C. The bars B are next laid in the channels of members C and the members D are then placed in position and soldered to the members C and E. The assembled parts are now squared and sized and the outer border A placed in position, its channel being occupied by the edges of the outside panes F and by the beveled ends of the bars B. The members C, D and F are next soldered to the border A and the whole structure cleaned of excess solder and all soilings. The complete panel is now inserted in the wooden sash or frame G, being held in place by the usual moldings 7.

Where double glazing or two thicknesses of glass are required I may provide a higher reinforcing bar A so as to raise the member D to admit the edges of the panes F'. A hole may be cut at intervals in the member D to admit its being soldered as at 8 to the bar B.

The advantages attending the use of my invention are manifold and apparent. Among them may be mentioned the following: The bar is firmly and completely incased between the two lead channels and is thereby entirely protected from the weather and from the corroding effect of condensation. The provision of the lead-incased bars in parallel lines, spanning the panel, braces the latter against wind-pressure and vibration and the weight and pressure of the load is distributed over the entire cross-section of the bars instead of hanging from soldered joints between the reinforcing bars and the lead channels as in the present practice. The incased bar cannot tear away from the panel as it is embedded therein and forms an integral part thereof. The panel thus can not sag or bulge. The beveled ends of my stiffening bars incline down to the level of the panel and are anchored in the metal border, thus avoiding the notching of the wooden frame or sash, as in the present practice. The lead casing over the bars conceals all unsightly joints, adding to the appearance of the window and making the same easier to clean.

In the present practice the bars are soldered to the panel after the latter is finished making it necessary to handle the same a second time and also to again clean it to free the glass from the acid used to solder the hard metal to the lead. This is all done away with by my invention and no acid is used. Ungalvanized iron or steel may be used in connection with my invention as the lead covering protects the reinforcing bars, thus effecting a very substantial economy in material. Under the present practice two men are required to solder a panel, while my invention requires but one man. The use of my channels and bars also facilitates the adjustment of the elements in proper relationship for assembling and a considerable saving in lead is effected where double glazing is required.

In packing for shipping the finished window or panel, the fact that the reinforcing bars are embedded in the window makes possible a saving of at least a third of the space where a number of panels are packed on top of the other.

What I desire to claim is:—

1. A reinforced element for leaded glass structures consisting of two coacting substantially U-shape lead members provided with lateral flanges, and a metal reinforcing bar incased within the same, for the purpose described.

2. A reinforced element for leaded glass structures consisting of two coacting substantially U-shape lead members provided with lateral flanges, the flanges of one of said members being adjacent to its base and the flanges of the other member being adjacent to its top, and a metal reinforcing bar incased within said members, for the purpose described.

3. A panel structure for leaded glass comprising a channel border, reinforcing bars spanning the interior of said border and having their ends inserted in the channel thereof, and coacting substantially U-shape lead members provided with lateral flanges incasing said bars and having their ends secured to said border.

Signed at Pittsburgh, Penna., this 3rd day of March 1914.

ALBERT W. WEITERSHAUSEN.

Witnesses:
E. A. Laurence,
F. C. Coppes.